US012605989B2

(12) United States Patent
Munoz et al.

(10) Patent No.: US 12,605,989 B2
(45) Date of Patent: Apr. 21, 2026

(54) COAXIAL KNOB CONTROL FOR VEHICLE VENT

(71) Applicant: GM GLOBAL TECHNOLOGY OPERATIONS LLC, Detroit, MI (US)

(72) Inventors: Angel R. Munoz, Rochester Hills, MI (US); Steven Jay Leathorn, Fort Gratiot, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 534 days.

(21) Appl. No.: 18/176,808

(22) Filed: Mar. 1, 2023

(65) Prior Publication Data

US 2024/0294054 A1 Sep. 5, 2024

(51) Int. Cl.
B60H 1/34 (2006.01)
B60H 1/00 (2006.01)

(52) U.S. Cl.
CPC ......... B60H 1/3421 (2013.01); B60H 1/0065 (2013.01); B60H 2001/3478 (2013.01)

(58) Field of Classification Search
CPC ................ B60H 1/3421; B60H 1/0065; B60H 2001/3478
USPC ........................................................ 454/155
See application file for complete search history.

(56) References Cited

U.S. PATENT DOCUMENTS 11,299,015 B2 *  4/2022  Munoz ................ B60H 1/3421
11,358,441 B2 *  6/2022  Morales .............. B60H 1/3421
12,146,541 B2 *  11/2024 Endo .................... B60H 1/3421

FOREIGN PATENT DOCUMENTS

DE   102020204799 A1   10/2021
FR       3095688 A1   11/2020
JP      H01204817 A    8/1989
KR      20090049475 A   5/2009

* cited by examiner

*Primary Examiner* — Steven B McAllister
*Assistant Examiner* — Dana K Tighe
(74) *Attorney, Agent, or Firm* — CANTOR COLBURN LLP

(57) ABSTRACT

A vent assembly of a vehicle includes a bezel defining a vent opening through which an airflow is directed. A primary vane extends across the vent opening and is movable about a primary vane axis to adjust an airflow direction in a first direction. A plurality of secondary vanes are arrayed across the vent opening and are movable about a secondary vane to adjust the airflow direction in a second direction. A primary adjustment knob is located on an adjustment shaft and is rotatable about an adjustment axis. The primary adjustment knob is configured to effect movement the primary vane about the primary vane axis. A secondary adjustment knob is coaxial with the primary adjustment knob and is independently rotatable about the adjustment axis. The secondary adjustment knob is configured to effect movement of the plurality of secondary vanes about their respective secondary vane axes.

17 Claims, 8 Drawing Sheets

COAXIAL KNOB CONTROL FOR VEHICLE VENT

INTRODUCTION

The subject disclosure relates to heating, ventilation and air conditioning of a vehicle. In particular, the present disclosure relates to directional control of airflow out of vents in the vehicle. Vehicles have multiple air vents in, for example, an instrument panel of the vehicle to distribute conditioned airflow into the passenger compartment of the vehicle. These vents typically use slide levers to move one or more sets of louvers or doors inside the vent to change the side-to-side and/or up-down direction of the airflow. With styling changes to vehicle interiors, the use of slim profile vents is increasing. The configuration of the slim profile vent makes the typical adjustment mechanism difficult to utilize. As such, it is desirable to provide an alternative to the typical adjustment mechanism, which is more compatible with the slim profile vent configuration.

SUMMARY

In one exemplary embodiment, a vent assembly of a vehicle includes a bezel defining a vent opening through which an airflow is directed. A primary vane extends across the vent opening. The primary vane is selectably movable about a primary vane axis to adjust a direction of the airflow in a first direction. A plurality of secondary vanes are arrayed across the vent opening. Each secondary vane is selectably movable about a secondary vane axis nonparallel to the primary vane axis to adjust the direction of the airflow in a second direction. A primary adjustment knob is located on an adjustment shaft and is rotatable about an adjustment axis. The primary adjustment knob is configured such that movement of the primary adjustment knob about the adjustment axis moves the primary vane about the primary vane axis. A secondary adjustment knob is coaxial with the primary adjustment knob and is independently rotatable about the adjustment axis. The secondary adjustment knob is configured such that movement of the secondary adjustment knob about the adjustment axis moves the plurality of secondary vanes about their respective secondary vane axes.

In addition to one or more of the features described herein, an adjustment barrel is located along the adjustment shaft. The adjustment barrel includes an adjustment groove therein. A vane pin extends from the primary vane and is positioned in the adjustment groove.

In addition to one or more of the features described herein, the vane pin is offset from the primary vane axis.

In addition to one or more of the features described herein, an adjustment cylinder extends from the secondary adjustment knob along the adjustment axis. An adjustment sleeve is located on the adjustment axis radially between the adjustment shaft and the adjustment cylinder and is corotational with the adjustment cylinder about the adjustment axis. A sleeve conical gear is located at the adjustment sleeve. The sleeve conical gear is operably connected to the plurality of secondary vanes to move the plurality of secondary vanes about their respective secondary vane axes via rotation of the sleeve conical gear about the knob axis.

In addition to one or more of the features described herein, the sleeve conical gear is slidably installed onto the adjustment shaft, such that when the adjustment shaft is moved along the adjustment axis the sleeve conical gear maintains operable connection with the plurality of secondary vanes.

In addition to one or more of the features described herein, the adjustment cylinder is configured to be slidable along the adjustment axis relative to the adjustment sleeve.

In addition to one or more of the features described herein, the primary adjustment knob and the secondary adjustment knob are moveable along the adjustment axis between an extended position for movement of the primary vane and the plurality of secondary vanes, and a locked position preventing movement of the primary vane and the plurality of secondary vanes.

In addition to one or more of the features described herein, in the locked position the primary adjustment knob and the secondary adjustment knob are at least partially recessed into the bezel.

In addition to one or more of the features described herein, a latch is operably connected to the adjustment shaft. The latch is configured to secure the primary adjustment knob and the secondary adjustment knob in the locked position.

In addition to one or more of the features described herein, a biasing member is configured to bias the primary adjustment knob and the secondary adjustment knob toward the extended position.

In another exemplary embodiment, a method of adjusting airflow through a vent assembly of a vehicle includes providing a primary adjustment knob at and rotatably about an adjustment axis. The primary adjustment knob is operably connected to a primary vane of the vent assembly via an adjustment shaft. A secondary adjustment knob is provided which is operably connected to a plurality of secondary vanes of the vent assembly. The secondary adjustment knob is coaxial with the primary adjustment knob and is independently rotatable about the adjustment axis. The primary adjustment knob is moved about the adjustment axis to rotate the primary vane about a primary vane axis to adjust a position of the primary vane. The secondary adjustment knob is moved about the adjustment axis to adjust a position of the plurality of secondary vanes. A direction of the airflow is adjusted as a result of adjusting the position of the primary vane and the plurality of secondary vanes.

In addition to one or more of the features described herein, the primary vane is rotated about the primary vane axis by moving a vane pin extending from the primary vane. The vane pin is operably connected to the primary adjustment knob via an adjustment barrel located on the adjustment shaft. The vane pin is located in an adjustment groove of the adjustment barrel.

In addition to one or more of the features described herein, the vane pin is offset from the primary vane axis.

In addition to one or more of the features described herein, the plurality of secondary vanes are moved about their respective secondary vane axes via rotation of a sleeve conical gear about the adjustment axis. The sleeve conical gear is located at an adjustment sleeve installed onto the adjustment shaft. The adjustment sleeve is positioned radially between the adjustment shaft and an adjustment cylinder extending from the secondary adjustment knob along the adjustment axis. The adjustment sleeve is corotational with the adjustment cylinder about the adjustment axis.

In addition to one or more of the features described herein, the sleeve conical gear is slidably installed onto the adjustment shaft, such that when the adjustment shaft is moved along the adjustment axis the sleeve conical gear maintains operable connection with the plurality of secondary vanes.

In addition to one or more of the features described herein, the adjustment cylinder is configured to be slidable along the adjustment axis relative to the adjustment sleeve.

In addition to one or more of the features described herein, the primary adjustment knob and the secondary adjustment knob are moved along the adjustment axis between an extended position for movement of the primary vane and the plurality of secondary vanes, and a locked position preventing movement of the primary vane and the plurality of secondary vanes.

In addition to one or more of the features described herein, in the locked position the primary adjustment knob and the secondary adjustment knob are at least partially recessed into the bezel.

In addition to one or more of the features described herein, the primary adjustment knob and the secondary adjustment knob are latched in the locked position via a latch operably connected to the adjustment shaft.

Additionally or alternatively, in this or other embodiments the primary adjustment knob and the secondary adjustment knob are biased toward the extended position by a biasing member operably connected to at least one of the primary adjustment knob and the secondary adjustment knob.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
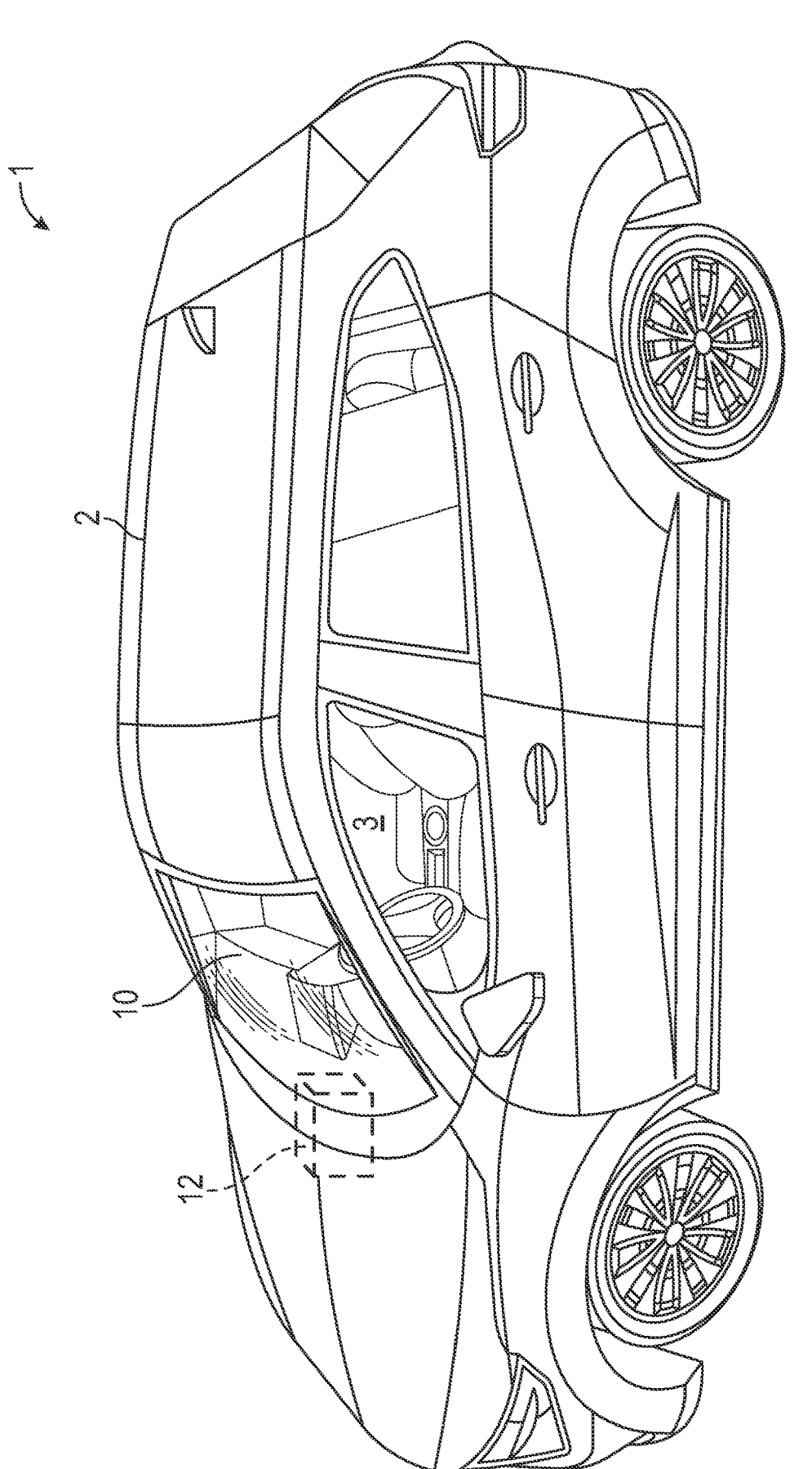
FIG. 1 is an illustration of an embodiment of a vehicle.

The following description is merely exemplary in nature and is not intended to limit the present disclosure, its application or uses. It should be understood that throughout the drawings, corresponding reference numerals indicate like or corresponding parts and features.

In accordance with an exemplary embodiment, illustrated in FIG. 1 is an embodiment of a vehicle 1. The vehicle 1 includes a vehicle body 2, which defines an occupant compartment 3 in an interior of the vehicle 1. The occupant compartment 3 includes an instrument panel 10 extending

Figures 2, 3:
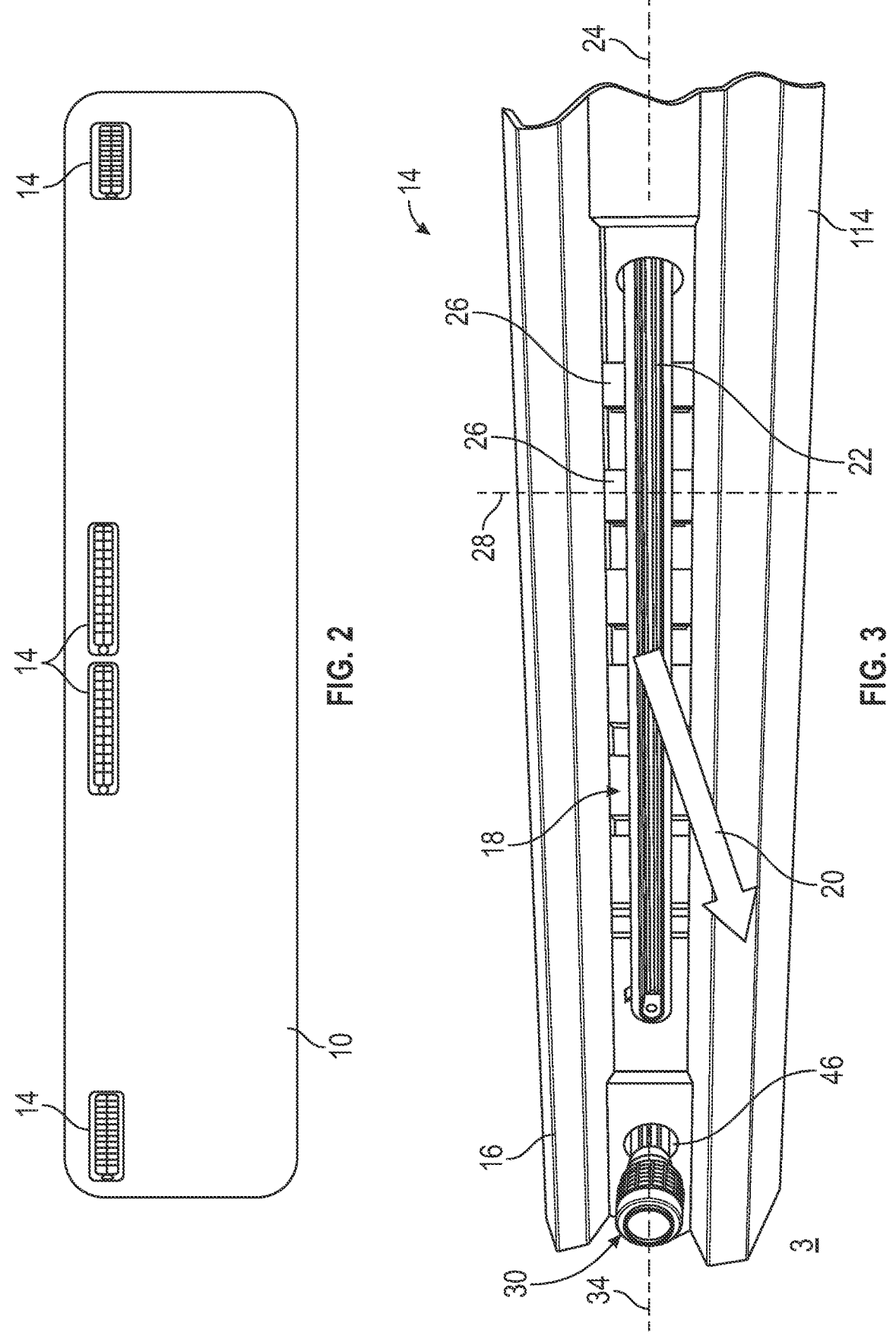
FIG. 2 is a schematic partial illustration of an embodiment of an instrument panel of a vehicle.
FIG. 3 is a perspective view of an embodiment of a vent assembly of a vehicle.

4 across the occupant compartment 3. The occupant compartment 3 is conditioned to be heated or cooled via a heating, ventilation and air conditioning (HVAC) system 12 with conditioned airflow into the occupant compartment 3. Referring now to FIG. 2, one or more vent assemblies 14 admit the conditioned airflow into the occupant compartment 3. The conditioned airflow is admitted into the passenger compartment 3 via one or more vent assemblies 14 located in the instrument panel 10. While the vent assemblies 14 are described herein as being located in the instrument panel 10, one skilled in the art will readily appreciate that the vent assemblies 14 may be additionally or alternatively located at other locations such as, for example, doors of the vehicle or a center console of the vehicle.

An embodiment of a vent assembly 14 is illustrated in FIG. 3. The vent assembly 14 includes a bezel 16, which defines a vent opening 18 through which the airflow 20 is directed into the occupant compartment 3. The vent assembly 14 includes a movable primary vane 22 which is rotatable about a primary vane axis 24, and a plurality of secondary vanes 26, which are each rotatable about respective secondary vane axes 28. The primary vane 22 and the secondary vanes 26 are disposed in a vent housing 114. In some embodiments, the primary vane axis 24 is a horizontal axis, such that rotation of the primary vane 22 about the primary vane axis 24 changes a direction of the airflow 20 in a first, vertical direction with respect to the passenger compartment 3. Further, in some embodiments the secondary vane axis 28 is a vertical axis, such that rotation of the secondary vanes 26 about their secondary vane axes 28 changes the direction of the airflow 20 in a second, horizontal direction. The primary vane 22 and secondary vanes 26 are moved to direct the airflow 20 in a selected or desired direction. The apparatus utilized to move the primary vane 22 and the secondary vanes 26 will be described in detail herein.

Figure 4:
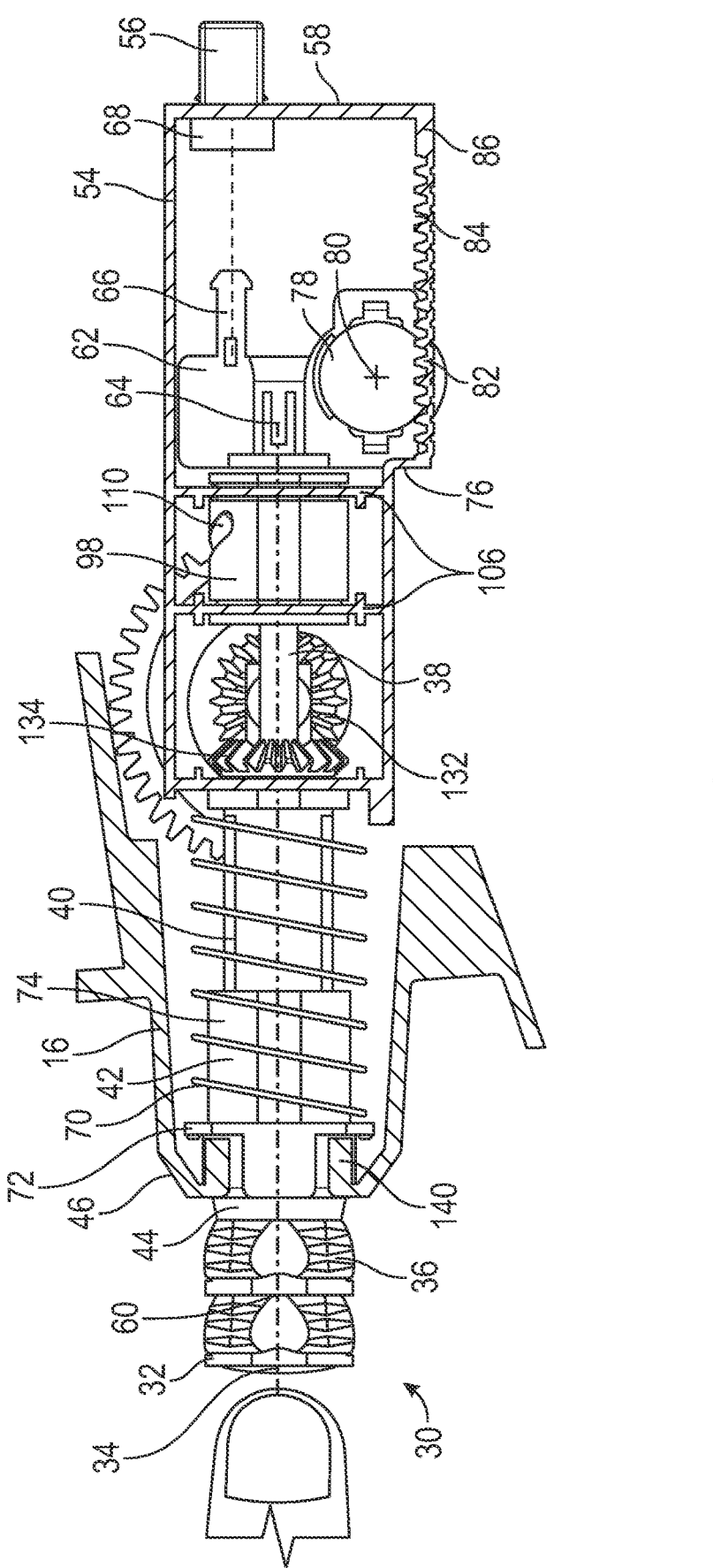
FIG. 4. is a side view of an embodiment of an adjustment mechanism of a vent assembly.
Figure 5:
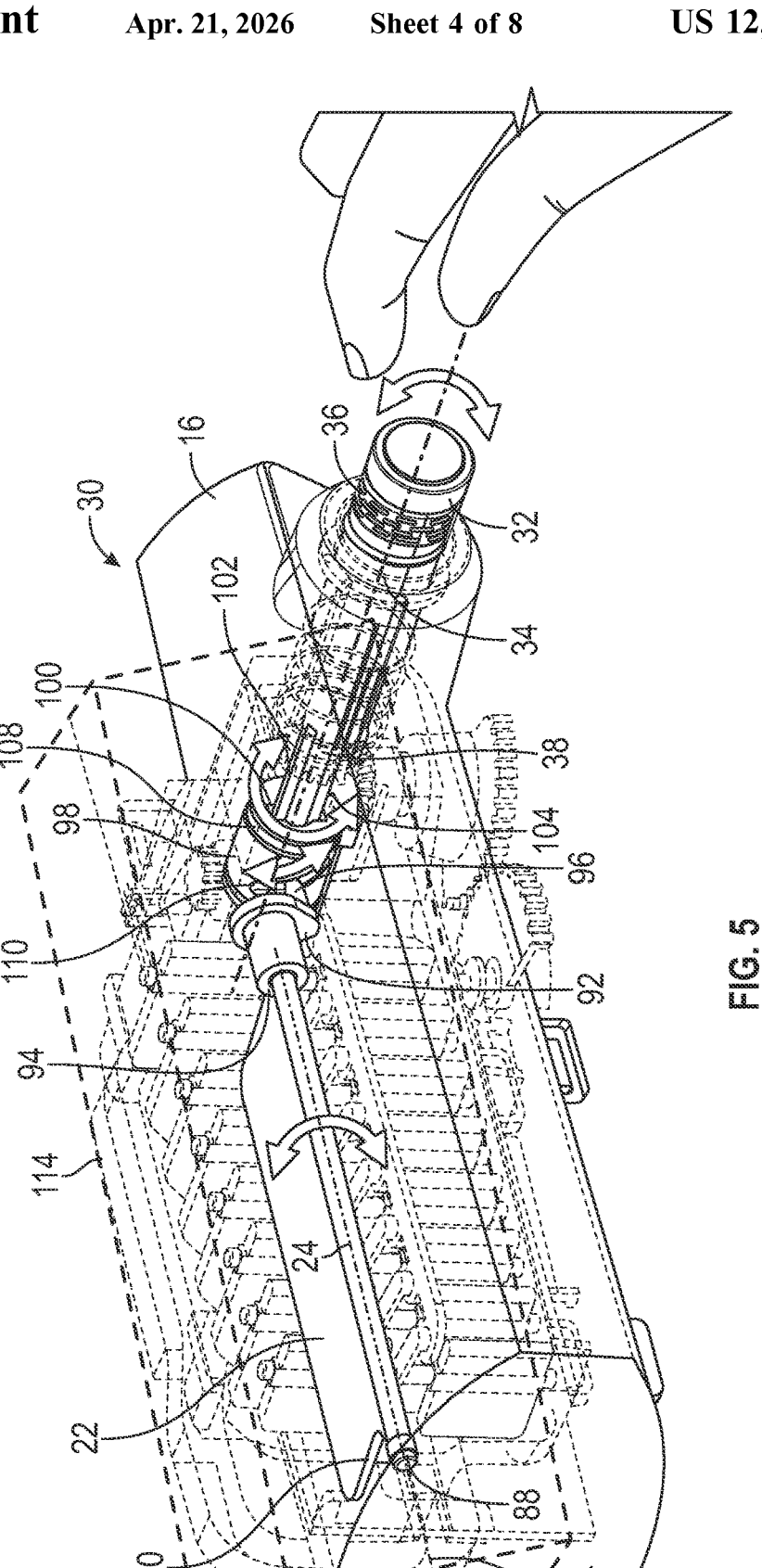
FIG. 5 is a partially disassembled view of an embodiment of a vent assembly illustrating adjustment of a primary vane.
Figure 6:
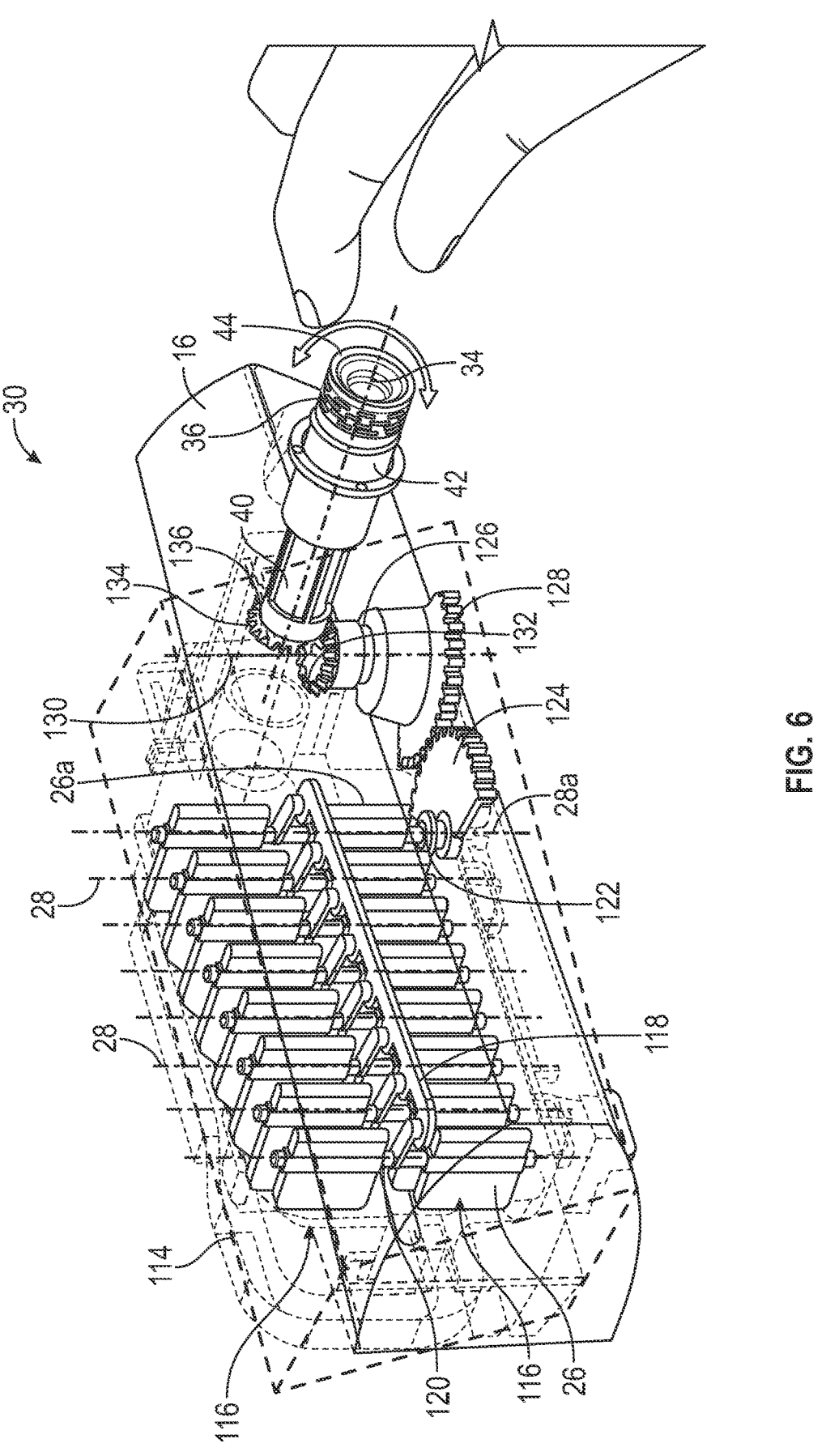
FIG. 6 is a partially disassembled view of an embodiment of a vent assembly illustrating adjustment of a plurality of secondary vanes.

Referring now to FIGS. 4-6, the vent assembly 14 includes an adjustment mechanism 30 that extends through the bezel 16 at a bezel opening 46 and which includes a pair of coaxial knobs, connected to the primary vane 22 and the secondary vane 26 (illustrated in FIG. 3). The adjustment mechanism 30 is located at or near one lateral end of the vent assembly 14. One skilled in the art, however, will readily appreciate that the adjustment mechanism 30 may be positioned at other locations along a lateral width of the vent assembly 14. The pair of coaxial knobs includes a primary adjustment knob 32 operably connected to the primary vane 22 to adjust a position of the primary vane 22 about the primary vane axis 24 via rotation of the primary adjustment knob 32 about an adjustment axis 34. The adjustment mechanism 30 further includes a secondary adjustment knob 36 operably connected to the secondary vanes 26 to adjust a position of the secondary vanes 26 relative to their respective secondary vane axes 28, via rotation of the secondary adjustment knob 36 about the adjustment axis 34.

Figure 7:
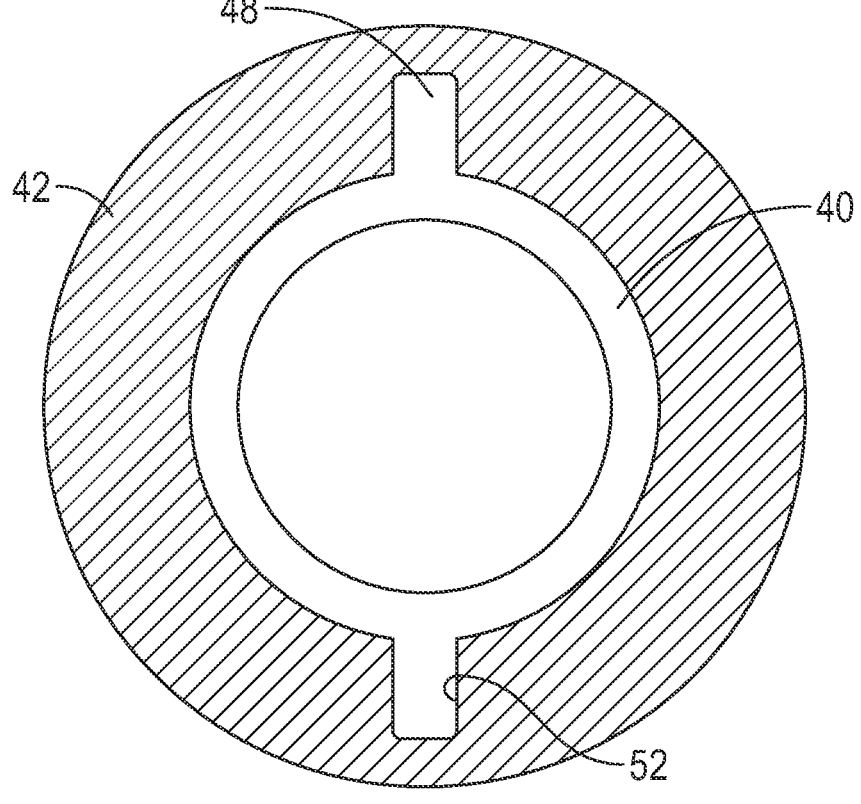
FIG. 7 is a cross-sectional view illustrating an interface of a cylinder and an adjustment shaft of an adjustment mechanism of a vent assembly.

As illustrated in FIG. 4, the primary adjustment knob 32 and the secondary adjustment knob 36 are positioned along an adjustment shaft 38. The primary adjustment knob 32 is directly coupled to the adjustment shaft 38, such that movement of the primary adjustment knob 32 axially along the adjustment axis 34 correspondingly moves the adjustment shaft 38 along the adjustment axis 34, and such that rotation of the primary adjustment knob 32 about the adjustment axis 34 correspondingly rotates the adjustment shaft 38 about the adjustment axis 34. In some embodiments the primary adjustment knob 32 is formed integral to the adjustment shaft 38 at a first shaft end 60 of the adjustment shaft 38. An adjustment sleeve 40 is coaxial with the adjustment shaft 38 and located radially outboard of and surrounding the adjustment shaft 38, such that the adjustment sleeve 40 is freely movable relative to the adjustment shaft 38, both axially along the adjustment axis 34 and rotationally about the adjustment axis 34. The secondary adjustment knob 36 is on a cylinder 42 surrounding the adjustment sleeve 40, with the secondary adjustment knob 36 located at a first axial cylinder end 44 of the cylinder 42. In some embodiments, the secondary adjustment knob 36 is formed integral with the cylinder 42. The cylinder 42 is freely movable along the adjustment axis 34, relative to the adjustment sleeve 40, but is rotationally coupled to the adjustment sleeve 40 such that rotation of the cylinder 42 about the adjustment axis 34 results in a corresponding rotation of the adjustment sleeve 40 about the adjustment axis 34. In some embodiments, such as illustrated in FIG. 7, the adjustment sleeve 40 includes one or more sleeve protrusions 48 extending radially outwardly from a sleeve body 50 which extends into a corresponding one or more cylinder channels 52. The interaction between the one or more sleever protrusions 48 and the one or more cylinder channels 52 rotationally couples the cylinder 42 to the adjustment sleeve 40. This arrangement to rotationally couple the cylinder 42 to the adjustment sleeve 40 is merely exemplary, and other mechanisms may be utilized. For example, in other embodiments, the arrangement may be substantially reversed, with protrusions extending radially inward from the cylinder 42 into channels on the adjustment sleeve 40.

Figure 8:
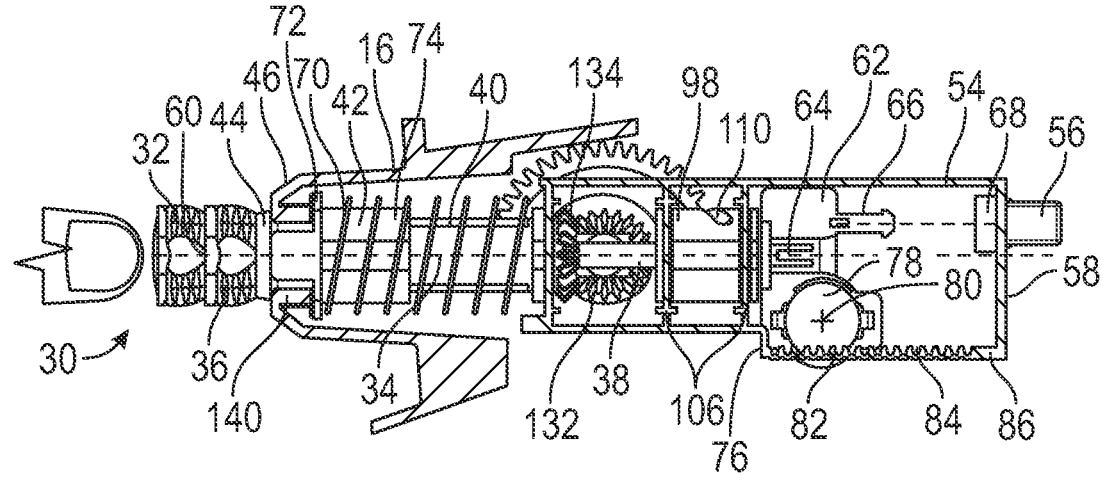
FIG. 8 is a side view of an embodiment of an adjustment mechanism in an extended position.
Figure 9:
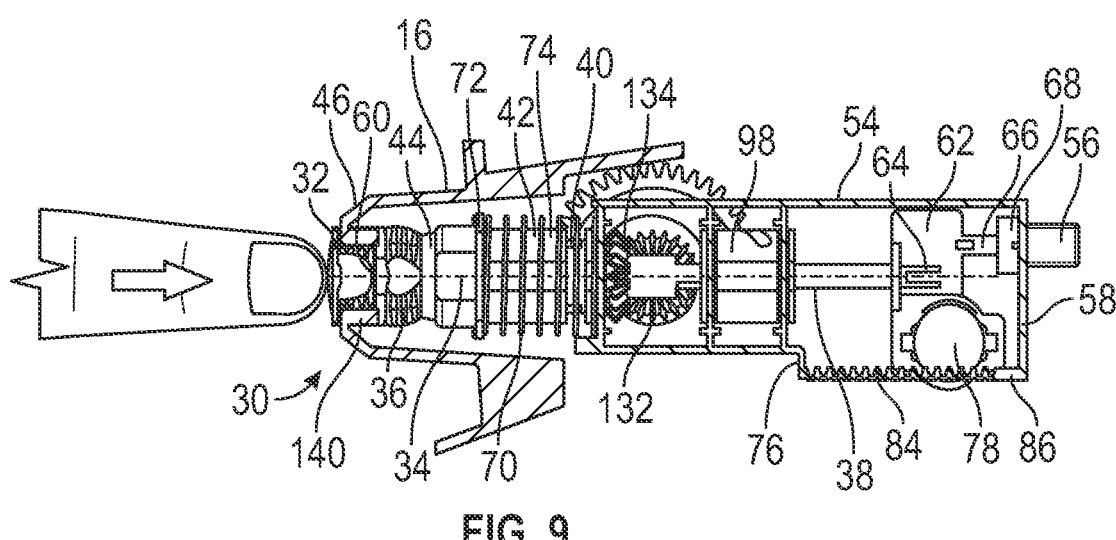
FIG. 9 is a side view of an embodiment of the adjustment mechanism in a locked position.

As illustrated in FIGS. 8 and 9, the adjustment mechanism 30 is movable between an extended position shown in FIG. 8 and a locked position shown in FIG. 9. When the adjustment mechanism 30 is in the extended position of FIG. 8, the primary adjustment knob 32 and the secondary adjustment knob 36 protrude from the bezel 16 at the bezel opening 46 allowing the primary vane 22 and the secondary vanes 26 to be adjusted via rotation of the primary adjustment knob 32 and the secondary adjustment knob 36 about the adjustment axis 34. On the other hand, when the adjustment mechanism 30 is in the locked position of FIG. 9, the primary adjustment knob 32 and the secondary adjustment knob 36 are recessed into the bezel opening 46 so user cannot move the primary adjustment knob 32 and the secondary adjustment knob 36 about the adjustment axis 34. In some embodiments, the difference in axial position of the primary adjustment knob 32 between the locked position and the extended position is in the range of 10 millimeters to 30 millimeters. In an exemplary embodiment, the difference in axial position is 20 millimeters.

Referring again to FIG. 4, the adjustment shaft 38 extends into a latch housing 54, which includes a latch 56 disposed at a housing end 58 of the latch housing 54. A latch guide 62 is connected to adjustment shaft 38 at a second shaft end 64 opposite the first shaft end 60 and moves axially along the adjustment axis 34 with the adjustment shaft 38, but the adjustment shaft 38 freely rotates about the adjustment axis 34 relative to the latch guide 62. The latch guide 62 includes a latch post 66 extending therefrom toward the latch guide 62. To move the adjustment mechanism 30 to the latched position from the extended position, the user pushes the primary adjustment knob 32 in the axial direction along the adjustment axis 34 thus urging the latch post 66 into a latch opening 68 of the latch 56, which includes one or more engagement features, such as tabs or the like to retain the latch post 66 within the latch 56. The adjustment sleeve 40 is disposed outside of the latch housing 54, and some embodiments of the adjustment mechanism 30 include a biasing spring 70 between the latch housing 54 and a sleeve stop 72 of the adjustment sleeve 40. In some embodiments the sleeve stop 72 is a rib extending radially outwardly from a sleeve body 74 of the adjustment sleeve 40. The biasing spring 70 is configured to bias the adjustment sleeve 40, and thus the adjustment shaft 38 toward the extended position. Thus, to move the adjustment mechanism 30 to the locked position, the user must overcome the spring force of the biasing spring 70.

To move the adjustment mechanism 30 from the locked position to the extended position, the user again presses on the primary adjustment knob 32, to move the adjustment shaft 38 along the latch axis 34. This action releases the latch post 66 from engagement with the latch 56, and the biasing spring 70 urges the adjustment sleeve 40 and thus the adjustment shaft 38, the secondary adjustment knob 36 and the primary adjustment knob 32 toward the extended position. The adjustment mechanism 30 includes one or more travel stops to prevent overtravel of the primary adjustment knob 32 and the secondary adjustment knob. In some embodiments, the sleeve stop 72 acts to stop travel of the adjustment sleeve 40 by butting against an opening flange 140 of the bezel 16. Additionally, the latch housing 54 may include a housing stop 76 which stops travel of the latch guide 62, and thus stops or limits travel of the adjustment shaft 38 and the primary adjustment knob 32.

In some embodiments, the latch guide 62 includes a damper gear 78 rotatable about a gear axis 80 relative to the latch guide 62. The damper gear 78 includes gear teeth 82 that engage complimentary housing teeth 84 at a housing wall 86 of the latch housing 54. This engagement provides a smooth and linear travel of the adjustment mechanism 30 from the locked position to the extended position.

Referring again to FIG. 5, with continuing reference to FIG. 4, when the adjustment mechanism 30 is in the extended position, the user may adjust a position of the primary vane 22 by rotating the primary adjustment knob 32 about the adjustment axis 34. A first vane pin 88 extends from a first primary vane end 90 at the primary vane axis 24 to retain the first primary vane end 90 in the vent housing 114. A primary vane cam 92 is located at a second primary vane end 94 and includes a second vane pin 96 extending therefrom. An adjustment barrel 98 is disposed on the adjustment shaft 38, surrounding the adjustment shaft 38. The adjustment barrel 98 has a central barrel opening 100 allowing the free axial movement of the adjustment shaft 38 relative to the adjustment barrel 98, while when the adjustment shaft 38 is rotated about the adjustment axis 34 the adjustment barrel 98 rotates with the adjustment shaft 38. In some embodiments, the adjustment shaft 38 includes one or more shaft ribs 102 that extend into complimentary barrel recesses 104 in the adjustment barrel 98 to rotationally retain the adjustment barrel 98 relative to the adjustment shaft 38, so that the adjustment barrel 98 rotates with rotation of the adjustment shaft 38. Further, in some embodiments, the adjustment barrel 98 is disposed in the latch housing 54 and is retained in an axial direction by one or more housing ribs 106 that abut or otherwise interact with the adjustment barrel 98 to limit or prevent movement of the adjustment barrel 98 along the adjustment axis 34. In some embodiments, the adjustment barrel 98 includes a barrel groove 108 into which a housing rib 106 at least partially extends to axially retain the adjustment barrel 98.

Figure 10:
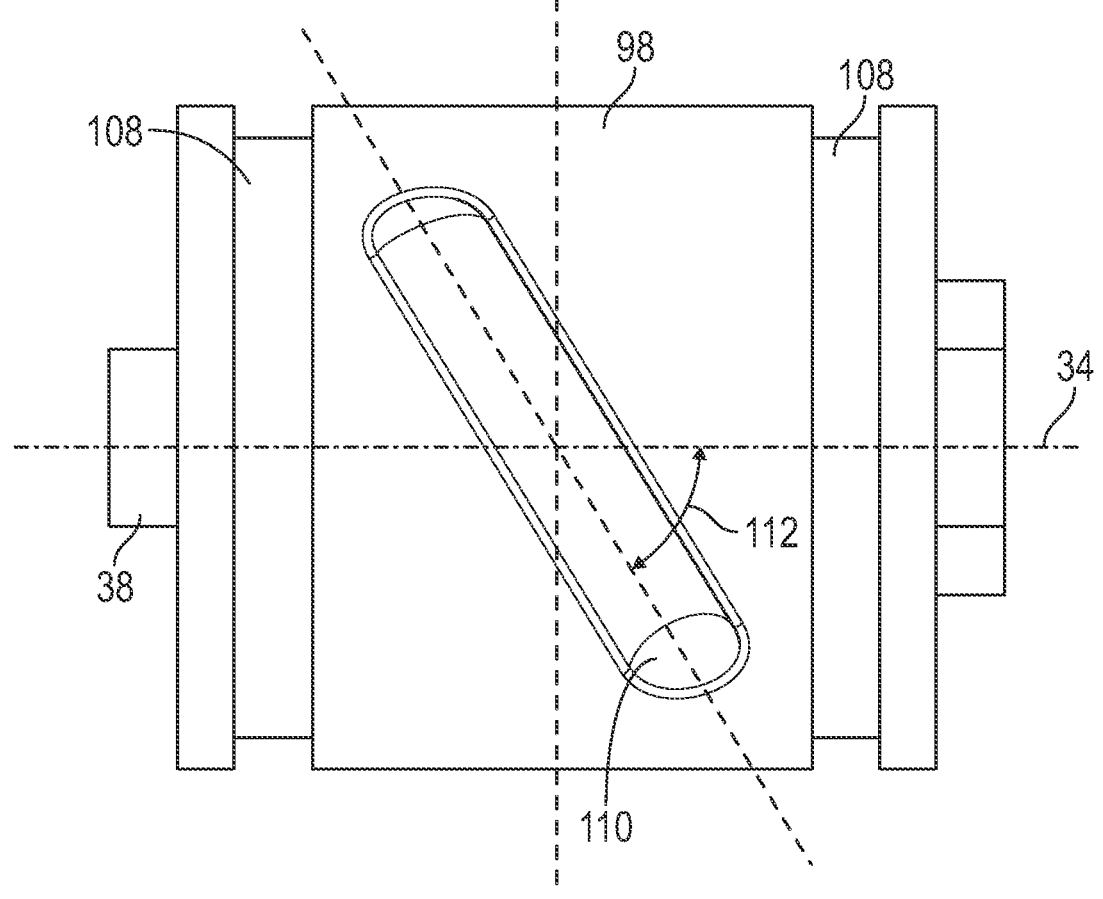
FIG. 10 is a perspective view of an embodiment of an adjustment barrel of the adjustment mechanism.

The adjustment barrel 98 includes an adjustment groove 110 in an outer barrel surface into which the second vane pin 96 is installed. As shown in FIG. 10, the adjustment groove 110 is oriented at a groove angle 112 relative to the adjustment axis 34, with the groove angle 112 defining the degree of adjustment of the primary vane 22 about the primary vane axis 24. For example, in some embodiments the groove angle 112 is in the range of 30 degrees to 45 degrees, which in some embodiments corresponds to an adjustment angle in the range of 30 degrees to 45 degrees of the primary vane 22 about the primary vane axis 24. In operation, as best illustrated in FIG. 5, when the user rotates the primary adjustment knob 32 about the adjustment axis 34, this rotates that adjustment shaft 38 and the adjustment barrel 98 about the adjustment axis 34 while the cylinder 42 remains rotationally stationary. Through the connection of the second vane pin 96 to the adjustment barrel 98 at the adjustment groove 110, the primary vane 22 is moved about the primary vane axis 24.

Referring now to FIG. 6, with continued reference to FIG. 4, when the adjustment mechanism 30 is in the extended position, the user may adjust a position of the secondary vanes 26 by rotating the secondary adjustment knob 36 about the adjustment axis 34. The secondary vanes 26 are rotatably secured in the vent housing 114 such that the secondary vanes 26 are rotatable about their respective secondary vane axes 28. In some embodiments, such as shown, the secondary vanes 26 are arranged in two or more vane rows 116. While two vane rows 116 are illustrated, one skilled in the art will readily appreciate that other embodiments may utilize, for example, a single vane row 116. The secondary vanes 26 are each connected to a linkage 118 via a respective linkage pin 120. The linkage 118 and linkage pin 120 ensure that the secondary vanes 26 rotate in unison about their respective vane axes 28. In some embodiments, the linkage 118 is positioned between adjacent vane rows 116.

One of the secondary vanes 26 is designated as a drive vane 26a and includes a drive pin 122 extending along the respective secondary vane axis 28 and is connected to a drive gear 124 rotatable about a drive secondary vane axis 28a. An intermediate drive member 126 includes an intermediate gear 128 that meshes with the drive gear 124 and is rotatable about an intermediate axis 130. In some embodiments, the intermediate axis 130 is parallel to the secondary vane axes 28. The intermediate drive member 126 further includes an intermediate conical gear 132 that is coaxial and corotational with the intermediate gear 128. The adjustment sleeve 40 includes a sleeve conical gear 134 at a sleeve end 136 opposite the first axial cylinder end 44. The sleeve conical gear 134 is meshed with the intermediate conical gear 132 such that rotation of the adjustment sleeve 40 via rotation of the cylinder 42 about the adjustment axis 34 drives rotation of the intermediate drive member 126 about the intermediate axis 130.

In operation, the user rotates the secondary adjustment knob 36 about the adjustment axis 34, thus rotating the cylinder 42 and the adjustment sleeve 40 about the adjustment axis 34, while the adjustment shaft 38 remains rotationally stationary. This, in turn drives rotation of the intermediate drive member 126 about the intermediate axis 130, via the mesh between the sleeve conical gear 134 and the intermediate conical gear 132. The rotation of the intermediate member 126 drives rotation of the drive gear 124 about the drive secondary vane axis 28a. This rotation is transmitted to the drive vane 26a and into the linkage 118 by the rotation of the drive vane 26a. The linkage 118 drives rotation of the remainder of the secondary vanes 26 about their respective secondary vane axes 28. Referring again to FIG. 4, in some embodiments, the adjustment sleeve 40 extends into the latch housing 54 such that the sleeve conical gear 134 in located inside the latch housing 54. A housing wall 138 of the latch housing 54 acts as an axial stop of the cylinder 52 to limit axial movement of the adjustment sleeve 40.

The adjustment mechanism 30 of the present disclosure provides adjustment of the primary vane 22 and the secondary vanes 26 through the coaxial but independently rotatable adjustment knobs 32, 36. This eliminates the need for the traditional visible slider knob from the vent opening, and provides an elegant solution aiding in enabling the incorporation of slim vent assemblies. Further, when in the locked position the adjustment mechanism 30 is recessed into the bezel 16 making it visually appealing and less intrusive to the user, when compared to traditional slider knob.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A vent assembly of a vehicle comprising:
   a bezel defining a vent opening through which an airflow is directed;
   a primary vane extending across the vent opening, the primary vane selectably movable about a primary vane axis to adjust a direction of the airflow in a first direction;
   a plurality of secondary vanes arrayed across the vent opening, each secondary vane selectably movable about a secondary vane axis nonparallel to the primary vane axis to adjust the direction of the airflow in a second direction;
   a primary adjustment knob disposed on an adjustment shaft and rotatable about an adjustment axis, the primary adjustment knob configured such that movement of the primary adjustment knob about the adjustment axis moves the primary vane about the primary vane axis;

a secondary adjustment knob coaxial with the primary adjustment knob and independently rotatable about the adjustment axis, the secondary adjustment knob configured such that movement of the secondary adjustment knob about the adjustment axis moves the plurality of secondary vanes about their respective secondary vane axes;

an adjustment cylinder extending from the secondary adjustment knob along the adjustment axis;

an adjustment sleeve disposed on the adjustment axis radially between the adjustment shaft and the adjustment cylinder, the adjustment sleeve corotational with the adjustment cylinder about the adjustment axis; and a sleeve conical gear disposed at the adjustment sleeve, the sleeve conical gear operably connected to the plurality of secondary vanes to move the plurality of secondary vanes about their respective secondary vane axes via rotation of the sleeve conical gear about the knob axis.

2. The vent assembly of claim 1, further comprising:

an adjustment barrel disposed along the adjustment shaft, the adjustment barrel including an adjustment groove therein; and a vane pin extending from the primary vane and disposed in the adjustment groove.

3. The vent assembly of claim 2, wherein the vane pin is offset from the primary vane axis.

4. The vent assembly of claim 1, wherein the sleeve conical gear is slidably installed onto the adjustment shaft, such that when the adjustment shaft is moved along the adjustment axis the sleeve conical gear maintains operable connection with the plurality of secondary vanes.

5. The vent assembly of claim 1, wherein the adjustment cylinder is configured to be slidable along the adjustment axis relative to the adjustment sleeve.

6. A vent assembly of a vehicle comprising:

a bezel defining a vent opening through which an airflow is directed;

a primary vane extending across the vent opening, the primary vane selectably movable about a primary vane axis to adjust a direction of the airflow in a first direction;

a plurality of secondary vanes arrayed across the vent opening, each secondary vane selectably movable about a secondary vane axis nonparallel to the primary vane axis to adjust the direction of the airflow in a second direction;

a primary adjustment knob disposed on an adjustment shaft and rotatable about an adjustment axis, the primary adjustment knob configured such that movement of the primary adjustment knob about the adjustment axis moves the primary vane about the primary vane axis; and a secondary adjustment knob coaxial with the primary adjustment knob and independently rotatable about the adjustment axis, the secondary adjustment knob configured such that movement of the secondary adjustment knob about the adjustment axis moves the plurality of secondary vanes about their respective secondary vane axes;

wherein the primary adjustment knob and the secondary adjustment knob are moveable along the adjustment axis between an extended position for movement of the primary vane and the plurality of secondary vanes, and a locked position preventing movement of the primary vane and the plurality of secondary vanes.

7. The vent assembly of claim 6, wherein in the locked position the primary adjustment knob and the secondary adjustment knob are at least partially recessed into the bezel.

8. The vent assembly of claim 6, further comprising a latch operably connected to the adjustment shaft, the latch configured to secure the primary adjustment knob and the secondary adjustment knob in the locked position.

9. The vent assembly of claim 6, further comprising a biasing member configured to bias the primary adjustment knob and the secondary adjustment knob toward the extended position.

10. A method of adjusting airflow through a vent assembly of a vehicle, comprising:

providing a primary adjustment knob at and rotatably about an adjustment axis, the primary adjustment knob operably connected to a primary vane of the vent assembly via an adjustment shaft;

providing a secondary adjustment knob operably connected to a plurality of secondary vanes of the vent assembly, the secondary adjustment knob coaxial with the primary adjustment knob and independently rotatable about the adjustment axis;

moving the primary adjustment knob about the adjustment axis to rotate the primary vane about a primary vane axis to adjust a position of the primary vane;

moving the secondary adjustment knob about the adjustment axis to adjust a position of the plurality of secondary vanes;

adjusting a direction of the airflow as a result of adjusting the position of the primary vane and the plurality of secondary vanes;

rotating the primary vane about the primary vane axis by moving a vane pin extending from the primary vane, the vane pin operably connected to the primary adjustment knob via an adjustment barrel disposed on the adjustment shaft, the vane pin disposed in an adjustment groove of the adjustment barrel; and moving the plurality of secondary vanes about their respective secondary vane axes via rotation of a sleeve conical gear about the adjustment axis, the sleeve conical gear disposed at an adjustment sleeve installed onto the adjustment shaft;

wherein the adjustment sleeve is disposed radially between the adjustment shaft and an adjustment cylinder extending from the secondary adjustment knob along the adjustment axis, the adjustment sleeve corotational with the adjustment cylinder about the adjustment axis.

11. The method of claim 10, wherein the vane pin is offset from the primary vane axis.

12. The method of claim 10, wherein the sleeve conical gear is slidably installed onto the adjustment shaft, such that when the adjustment shaft is moved along the adjustment axis the sleeve conical gear maintains operable connection with the plurality of secondary vanes.

13. The method of claim 10, wherein the adjustment cylinder is configured to be slidable along the adjustment axis relative to the adjustment sleeve.

14. The method of claim 10, further comprising moving the primary adjustment knob and the secondary adjustment knob along the adjustment axis between an extended position for movement of the primary vane and the plurality of secondary vanes, and a locked position preventing movement of the primary vane and the plurality of secondary vanes.

15. The method of claim 14, wherein in the locked position the primary adjustment knob and the secondary adjustment knob are at least partially recessed into the bezel.

16. The method of claim 14, further comprising latching the primary adjustment knob and the secondary adjustment knob in the locked position via a latch operably connected to the adjustment shaft.

17. The method of claim 14, biasing the primary adjustment knob and the secondary adjustment knob toward the extended position by a biasing member operably connected to at least one of the primary adjustment knob and the secondary adjustment knob.

\* \* \* \* \*